Oct. 15, 1929.    F. G. HENRY    1,731,776
GYROSCOPIC CONTROL SYSTEM
Filed July 27, 1925    3 Sheets-Sheet 1

Oct. 15, 1929.  F. G. HENRY  1,731,776
GYROSCOPIC CONTROL SYSTEM
Filed July 27, 1925   3 Sheets-Sheet 3
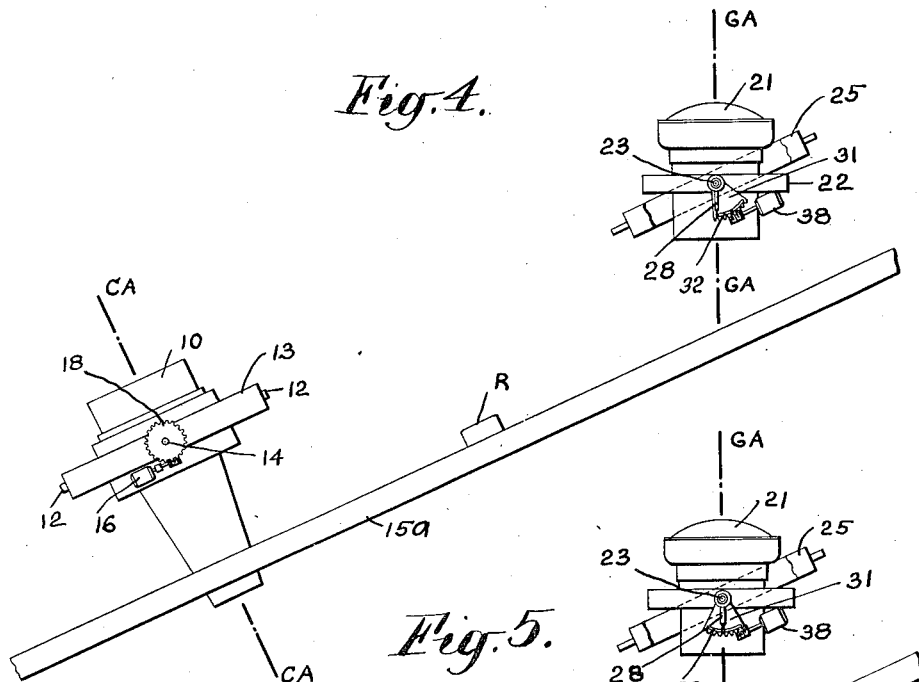
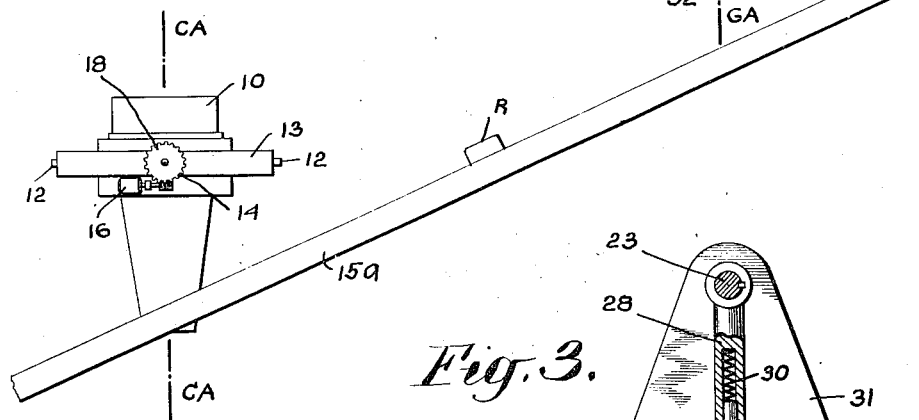
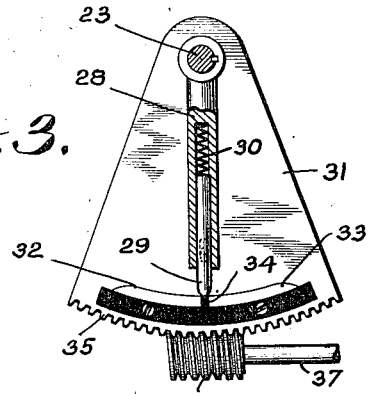
Inventor
F. G. Henry
By his Attorneys
Cooper, Kerr & Dunham Patented Oct. 15, 1929

1,731,776

UNITED STATES PATENT OFFICE

FERDINAND GEORGE HENRY, OF NEW YORK, N. Y., ASSIGNOR TO FAIRCHILD AERIAL CAMERA CORPORATION, A CORPORATION OF NEW YORK

GYROSCOPIC CONTROL SYSTEM

Application filed July 27, 1925. Serial No. 46,370.

This invention relates generally to the utilization of the well known principle of gyroscopic operation by virtue of which a gyroscope tends to maintain its axis constant in direction, and the chief object of the invention is to utilize this principle in a simple and effective manner for maintaining another device, or some part thereof, substantially constant in direction, by suitable connection with the gyroscope. Another object is to provide connecting and controlling means of rugged yet delicate character so that the load on the gyroscope, in performing its controlling function, will be minimized, thereby minimizing the precessional tendency generally incident to unbalanced moments. A further object is to provide electrical connecting and controlling mechanism which will minimize the lag between departure of the gyroscope support from its normal position with respect to the gyroscope axis, and the resulting movement of the controlled device to its normal position relative to the gyroscope axis. To these and other ends the invention comprises the novel features, elements and combinations, hereinafter disclosed.

The preferred embodiment of the invention is illustrated herein as designed for maintaining the optical axis of an aerial camera in a substantially constant direction regardless (within certain limits) of the rocking or tilting of the airplane in flight. In this embodiment the camera and the gyroscope are mounted in independent supports, as for example gimbal rings of suitable construction, permitting the supports, which are preferably mounted rigidly on or in the airplane, to rock freely in all directions relative to the axes of the respective devices. The camera support is equipped with a pair of reversible motors, one for each gimbal axis, by which, as the airplane rocks or tilts, either or both rings may be rocked to bring the optical axis of the camera back to its normal direction or position relative to the axis of the gyroscope. These motors are actuated, singly or together, in the proper direction or directions of rotation to effect this result, under the control of the gyroscope, so that as the airplane tilts or rocks in one direction (the gyroscope axis remaining constant in direction) the camera will be rocked, in general, in the opposite direction. The electrical connection between the gyroscope and the camera-rectifying motor or motors is made through a relay system, so that the load imposed on the gyroscope involves, generally, nothing more than the closing of a pair of contacts in the relay circuit, which circuit in turn closes the motor circuit. In conjunction with the gyroscope contacts, means are provided for opening the same as soon as the camera is "rectified", such means being electrically actuated and controlled in synchronism with the rectifying motor or motors.

The embodiment briefly outlined above is illustrated, rather diagrammatically, in the accompanying drawings, in which Fig. 1 is a side view, partly in section, showing the camera and the gyroscope, universally mounted in gimbals, with the rectifying motors associated with the camera, the gyroscope contacts by which the relays are controlled, and the motors for returning the gyroscope contacts to normal position.

Fig. 3 is a detail side view of one of the gyroscope contact mechanisms.

Fig. 4 is a diagrammatic side view showing the relative angular positions of the camera and gyroscope which would result from a certain tilting of the airplane without compensating rectification of the camera.

Fig. 5 is a view similar to Fig. 4 but showing the position of the camera after rectification.

Fig. 6 is a detail plan view of the relay assembly.

Figure 1:
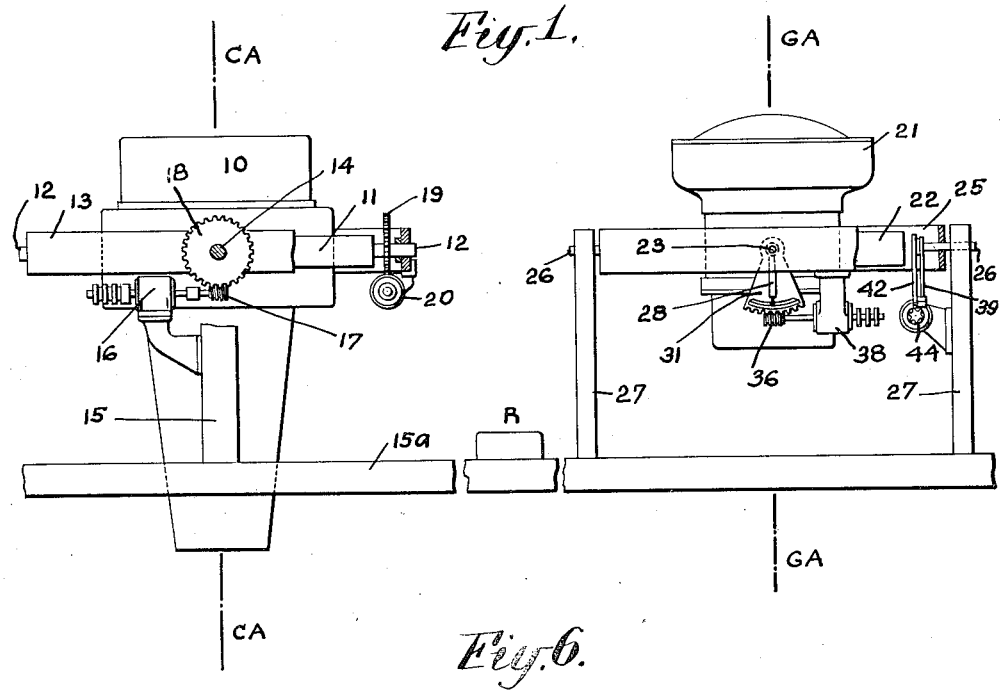

The camera 10 is carried, preferably removably, by the inner gimbal ring 11, provided with journals or trunnions 12, 12, by which it is pivotally mounted in the outer ring 13. The latter is provided with trunnions which are mounted in suitable supports to permit the ring to rock on an axis perpendicular to the axis of the first or inner ring. One of the trunnions of the outer ring is shown at 14 and one of the supports is indicated at 15. These supports are carried by the airplane frame, represented diagrammatically at 15$^a$. The support 15 carries a motor 16, the armature shaft of which has a pinion 17 meshing with the gear 18 on the trunnion 14. It will therefore be seen that when the motor is in operation the outer ring, and with it the inner ring and camera, will be rocked on the axis of the trunnion 14 in a direction (clockwise or counterclockwise) dependent upon the direction of rotation of the motor. Similarly the trunnion 12 of the inner ring is equipped with a gear 19, actuated by the motor 20 carried by the outer ring 13; so that when the latter motor is running, the inner ring, and with it the camera, will be rocked in one direction or the other according to the direction of rotation of the motor. Either motor may operate independently of the other, in either direction, or both may operate simultaneously, as will appear more fully hereinafter. Suitable counterweights, not shown, may be provided to balance the parts.

The gyroscope 21, driven by an electric motor, not shown, is mounted, preferably removably, in an inner gimbal ring 22 having journals or trunnions 23, mounted in the outer gimbal ring 25, which latter is provided with trunnions 26 mounted in suitable supports, as 27, at right angles to the axis of trunnions 23. The supports for the outer ring are carried by the airplane frame, indicated at 15$^a$. Fixed on trunnion 23, inside of ring 25, is a contact member 28 (see also Fig. 3) having a radially movable finger 29 mounted in a bore in member 28 and urged outwardly by a light spring 30 into light contact with an arc-shaped contact device carried by a sector-shaped support 31 pivotally mounted on the trunnion 23. The contact device just mentioned comprises two insulated contacts 32, 33, separated by a narrow tongue 34 of insulating material. Normally the contact finger 29 is in contact with the tongue 34. The arc-shaped edge of the sector is provided with worm-teeth, as indicated at 35, to mesh with a worm 36 on the armature shaft 37 of a motor 38 carried by the outer ring 25, so that when the motor is actuated the contact sector will be swung on its pivot, the trunnion 23. Journal or trunnion 26, on the outer ring 25, is similarly equipped with a contact member 39, contacts 40, 41 (see Fig. 2), contact sector 42, worm 43, and motor 44 carried by the frame 27.

The gyroscope contact mechanisms control four relays 45, 46, 47, 48 (Fig. 2), which, through their bell-crank armatures 49, 50, 51, 52, control the four motors 16, 38, 20, 44—relay 45 causing motors 16 and 38 to run simultaneously in one direction, and relay 46 causing them to run in the opposite direction. Similarly, relays 47 and 48 cause motors 20 and 44 to run in one direction or the other according to which relay is energized. The spring relay-armatures play between and bear normally against the adjustable contacts 53, 54, 55, 56, 57, 58, 59, 60. Armatures 49, 50 are mounted together on a pivoted block 61, so that when armature 49, for example, is rocked counterclockwise it will separate from contact 54, and will also rock armature 50 and thereby separate the same from contact 55. A similar operation takes place when armature 50 is rocked clockwise by its magnet 46. Armatures 51, 52 are mounted on a pivoted block for like cooperation with contacts 57, 58, 59, 60. The relay mechanism is represented diagrammatically at R, Figs. 1, 4 and 5.

For the purpose of explaining the operation of my control or rectifying system it is assumed that it is desired to keep the camera axis CA—CA in parallelism with the gyroscope axis GA—GA. This condition is illustrated in Fig. 1, which also indicates that the airplane, represented diagrammatically by the frame-member 15$^a$, is perfectly level. When the two axes are in parallelism, as in Fig. 1 for example, the four relay armatures are in engagement with their eight contacts. Under these conditions current is constantly flowing through all four motor fields 65, 66, 67, 68, thus: from source S through wires 70 and 71 to fields 66, 68, and thence to grounds 72, 73; from source S through wires 74, 75 to contacts 53, 57, and 55, 59; from contact 53 through armature 49 to contact 54; from contact 55 through armature 50 to contact 56; from contacts 56—54 (which are in parallel to each other) through wire 76 to field 65 and thence to ground 77; from contact 57 through armature 51 to contact 58; from contact 59 through armature 52 to contact 60; from contacts 58—60 (which are in parallel to each other) through wire 78 to field 67 and thence to ground 79. It will also be observed that the brushes 80, 81 bearing on commutator 82 of motor armature 16 are connected across armatures 49, 50, respectively, by wires 83, 84, and that no current flows through the motor armature since the two relay armatures are at the same potential, being both connected to the same pole of the source S. Similarly the brushes 86, 87 of motor 20 are connected across relay armatures 51, 52, with like effect. Having the motor fields constantly energized is an important advantage, since each motor is then ready to start instantly and since the energized field acts as an electric brake on its armature whenever current ceases to flow through the armature circuit. Assume now that the airplane tilts, say to the angle indicated in Fig. 4. Inasmuch as the camera gimbal rings are locked together and to the airplane frame by the controlling or rectifying motors and gears, it will be seen that the camera would take the position shown in Fig. 4. On the other hand, the gyroscope rings are not locked together nor to the frame (sectors 31 and 42 being loose on the trunnions), and hence ring 25 tilts to the position shown in Fig. 4, leaving the direction of the gyroscope axis unchanged. As the airplane begins to tilt, the contact arm 28, rigidly mounted on the trunnion 23 of the inner ring, does not tilt; but the sector 31, locked to the outer ring by the worm 36 and motor 38, swings with the latter ring, thereby bringing contact 32, Fig. 3, under the contact arm. The following circuit (Fig. 2) is thus established: ground 90, contact arm 28, contact 32, wire 91, relay 45, wires 92, 93, 75, 74, current source S, and ground 79. Relay 45, thus energized, rocks counterclockwise its armature 49 and also armature 50, thereby opening gaps at contacts 54 and 55. Motor armature 16 is now in series with its field, thus: source S, wire 74, contact 53, relay armature 49, wire 83 (armature 49 being disengaged from contact 54), brush 80, commutator 82, brush 81, wire 84, relay armature 50, contact 56, wire 76, field 65, ground 77; thereby causing motor 16 to run in the direction necessary to rock gimbal ring 13, Fig. 4, in the clockwise direction.

In order to control the operation of the rectifying motors 16, 20 so that their operation will terminate as soon as the camera axis CA—CA has attained parallelism with the gyroscope axis GA—GA, follow-up connections are provided. The follow-up connections comprise electrical mechanism by which sectors 31, 42 are caused to follow contact members 28, 39, respectively, as their angular relation to the airplane frame 15ª changes from the normal relation, Figs. 1 and 5. Only the description of the electrical follow-up mechanism between rectifying motor 16 and sector 31 with its associated worm 36 will be set forth in detail since the corresponding mechanism associated with rectifying motor 20 and sector 42 is of a similar character.

The armature shaft of motor 16 also carries an insulated commutator 100, having brushes connected to ground 77 by wire 101 and to the source S by wire 102. This commutator, the bars of which are three, or a multiple of three, in number, delivers current from the source to the three slip rings 103, 104, 105, in succession, which rings are connected by brushes 106, 107, 108 and wires 109, 110, 111, to rings 112, 113, 114, on the armature shaft of motor 38. The latter rings are connected with the three-pole armature windings (not shown) of motor 38, so that, as will be readily seen, the motor just mentioned runs in exact synchronism with motor 16, since the "frequency," so to speak, of the current delivered to the armature of motor 38 is directly dependent upon the speed of motor 16. When I say synchronism here I do not mean that the two motors necessarily have the same speed, since the speeds at which they should run (assuming that it is desired to have the camera and the gyroscope contact-sector return to normal position simultaneously) depends upon the ratios of the gearing through which the respective motors actuate the camera and sector. Thus if the two gear-ratios are equal, the motors should have the same speed.

Figure 2:
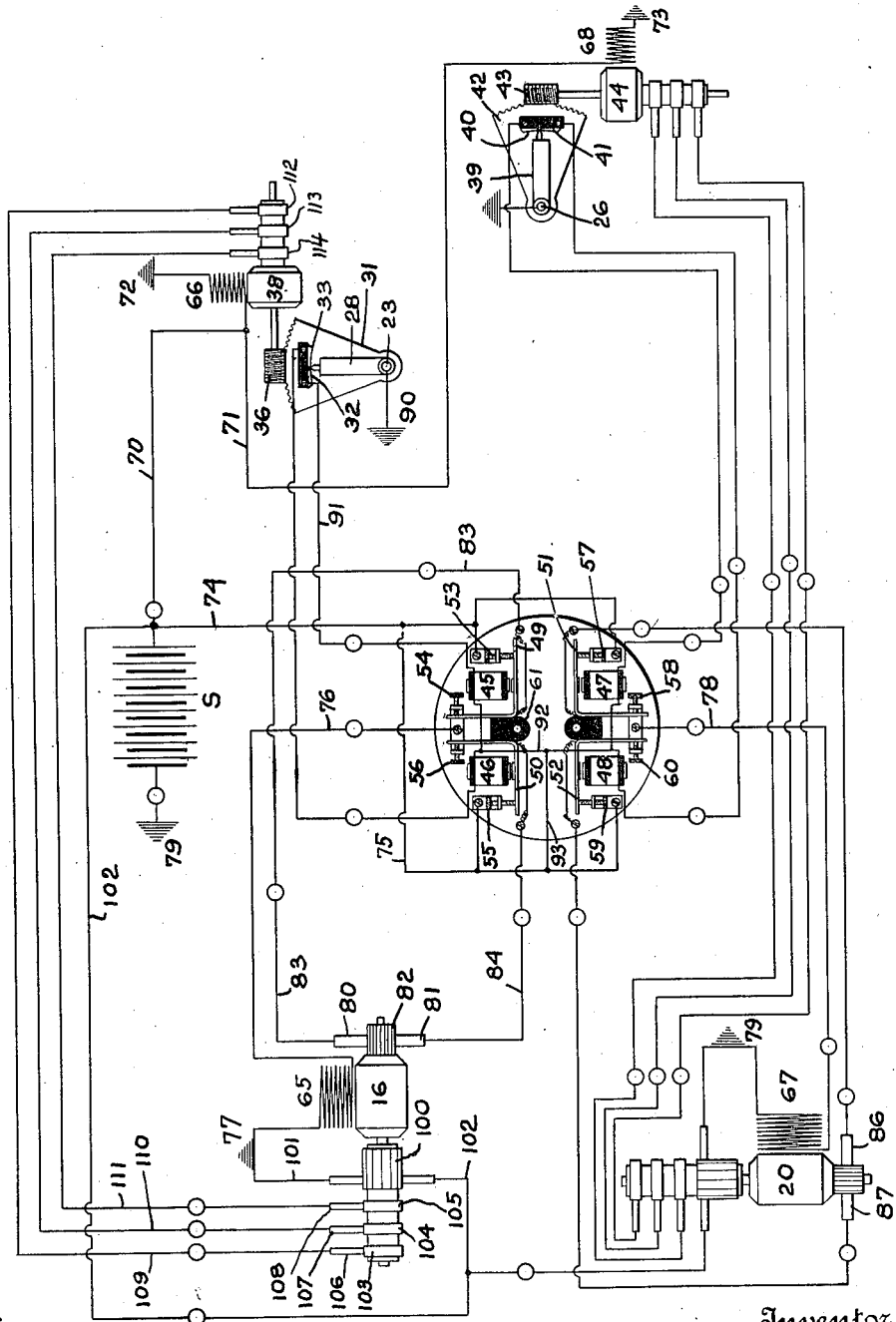
Fig. 2 is a diagram showing the electrical circuits of the system.

The circuits above described having been established, the motor 16 (Fig. 4) rocks the camera clockwise and at the same time motor 38 rocks contact sector 31 in the same direction at the same angular speed, so that at the instant the camera axis CA—CA reaches parallelism with the gyroscope axis GA—GA, the insulating tongue 34, Fig. 3, comes under the contact finger 29 and breaks the relay circuit traced above, whereupon armature 49 swings back to normal or initial position, thus restoring the circuit conditions shown in Fig. 2, in which none of the motors is running. The camera, gyroscope, and airplane 15 are then in the relative angular positions indicated in Fig. 5.

If the tilt of the airplane had been in the opposite direction to that indicated in Fig. 4, contact 33 (Fig. 3) on sector 31 would have been brought under contact arm 28, thereby energizing relay 46, which in turn puts the armature of motor 16 in series with its field but in the opposite direction. The motors then run in the opposite direction, as will be seen by tracing the circuits, and return the camera to the position in which its axis is parallel to the gyroscope axis, at the same time returning the gyroscope contact sector to normal position.

In like manner, relays 47 and 48, themselves controlled by contact arm 39, Fig. 1, control motors 20 and 44 to rectify the camera and gyroscope sector for tilts at right angles to those already described. Similarly, if the airplane tilts in both directions at once, that is, in a plane parallel to the plane of Fig. 1 and also in a plane perpendicular thereto, all four motors will operate to produce the necessary rectification on two axes of tilt.

It will be seen that the maximum angle for which rectification can be effected depends (other conditions being the same) upon the angular extent of the individual contacts 32 and 33, for example; since if the sector swings far enough to carry either contact (32 or 33) out from under the finger 29 the relay circuit will be broken and thereafter no further rectification will occur. In photography of the earth from an airplane, a maximum rectification of ten degrees, or at most about fifteen degrees, is usually ample. When, after the maximum angle of tilt is exceeded, the plane tilts back toward normal, the appropriate contact 32 or 33, for example, re-engages the contact finger and starts rectification in the proper direction. To permit easy re-engagement, the outer ends of the contacts are rounded off, as indicated in Fig. 3.

It will be observed that the only "work" done by the gyroscope is that necessary to overcome the slight frictional resistance of the moving contacts as they swing across the gyroscope contact-finger. The gyroscope can therefore be small and relatively light. The location of the gyroscope and camera relative to each other, whether near to or remote from each other, is in general immaterial, since the two are connected only by electric conductors, which may be as short or long as necessary. Similarly, the relay mechanism may be located in any convenient position.

I have described the invention as employed for controlling an aerial camera, but it is not limited to such use, since it can readily be adapted to a great variety of uses, as for example to rectify or stabilize a bomb-sight, or even a floating gun-platform.

It is to be understood that the invention is not limited to the specific construction herein illustrated and described but can be embodied in various forms without departure from its spirit.

I claim—

1. In a gyroscopic control system, in combination, a gyroscope, a gyroscope mounting capable of pivotal movement relative to the gyroscope, an object which is to be maintained in a constant angular position relative to the gyroscope, a mounting for said object permitting relative pivotal movement, electrically controlled motor means for rocking the said object in its support, an electrical relay system controlling said motor means, relay-controlling contacts associated with the gyroscope and electrically connected with the relay system to cause operation thereof as the gyroscope mounting departs from a predetermined angular position relative to the gyroscope, and electrical follow-up connections controlled by said motor means for rendering said relay controlling contacts ineffective to cause operation of said relay system.

2. In a gyroscopic control system, in combination, a gyroscope, an object which is to be maintained in a predetermined angular position relative to the gyroscope, electrically controlled motor means for shifting said object pivotally, electrical relay means connected with said motor means to control the same, electrical contact means associated with the gyroscope and connected with the relay means to control the latter as the said object departs from said predetermined angular position, and electrical follow-up connections between said motor means and said electrical contact means.

3. In a gyroscopic control system, in combination, a gyroscope, a mounting therefor capable of pivotal movement relative thereto, a pivotally mounted object to be maintained in predetermined angular position relative to the gyroscope, electrically controlled motor means connected with said object to rock the same, gyroscope-controlled relay means connected with said motor means to cause the latter to operate in harmony with the pivotal movement of the gyroscope mounting relative to the gyroscope, and electrical follow-up connections for rendering said gyroscope controlled relay means ineffective to cause said motor means to rock said object when said object is in predetermined position relative to said gyroscope.

4. In a gyroscopic control system, in combination, electrically controlled means for rectifying a pivotally mounted object, a gyroscope, a pivoted member on which the gyroscope is pivotally mounted, a contact rigidly connected with the gyroscope, a contact connected with said pivoted member to move in harmony with said pivoted member relatively to the first contact, and electrical relay means connected with said contacts and with said rectifying means to control the same in harmony with the relative movements of said contacts.

5. A camera stabilizing system comprising, in combination, gyroscopic controlled elements including contacts, a camera, rectifying motors for operating said camera and controlled by said gyroscopic controlled elements, and electrical follow-up connections between said rectifying motors and said elements which control said rectifying motors.

6. A camera stabilizing system comprising, in combination, gyroscopic controlled elements including contacts, a camera, rectifying motors for operating said camera and controlled by said gyroscopic controlled elements, and electrical follow-up connections controlled by said rectifying motors for rendering said gyroscopic controlled elements ineffective to operate said camera.

7. A camera stabilizing system comprising, in combination, a gyroscopic controlled elements including contacts, a camera, rectifying motors for operating said camera and controlled by said gyroscopic controlled elements, and electrical follow-up connections between said rectifying motors and said elements which control said rectifying motors, said follow-up connections including pairs of impulse transmitters and receiving motors.

8. A camera stabilizing system comprising, in combination, gyroscopic controlled elements including contacts, a camera, rectifying motors for operating said camera and controlled by said gyroscopic controlled elements, and electrical follow-up connections controlled by said rectifying motors for rendering said gyroscopic controlled elements ineffective to operate said camera, said follow-up connections including pairs of impulse transmitters and receiving motors.

9. A camera stabilizing system comprising, in combination, a camera mounted for universal pivotal movement, a gyroscope mounted for universal pivotal movement, rectifying motor means normally locking said camera to its mountings, gyroscopic controlled elements including contacts for controlling the operation of said rectifying motor means, and electrical follow-up connections operative during the operation of said rectifying motor means to cause a break of said contacts when said camera and said gyroscope are in substantially parallel relation.

10. A camera stabilizing system comprising, in combination, a camera mounted for universal pivotal movement, a gyroscope mounted for universal pivotal movement, rectifying motors for maintaining said camera in substantial parallelism with said gyroscope, gyroscopic control elements including contacts, relay means controlled by said contacts and controlling said rectifying motors, said rectifying motors having their fields continually excited, and means controlled by the operation of said rectifying motors whereby said contacts are rendered ineffective to cause said relay means to cause the operation of said rectifying motors when said camera is in substantial parallel relation with said gyroscope.

11. An object stabilizing system comprising, in combination, gyroscope controlled contacts, a plurality of relays under the control of said contacts, an object, means pivotally supporting said object rectifying motors associated with said means whereby said object may be pivoted, and means controlled by said plurality of relays for continuously maintaining current flow through the fields of said rectifying motors.

12. An object stabilizing system comprising, in combination, gyroscope controlled contacts, an object, means pivotally supporting said object, rectifying motors associated with said means whereby said object may be pivoted, a circuit for maintaining the fields of said rectifying motors energized, means for controlling the operation of said motors, and a plurality of relays controlled by said contacts for cntrolling said means and for maintaining the fields of said motors continuously energized.

13. In a gyroscopic control system, in combination, a gyroscope, a mounting therefor permitting relative pivotal movement, an object whose angular position is to be controlled by the gyroscope, a mounting for such object permitting relative pivotal movement, contacts carried by the gyroscope and its mounting and moving relative to each other during relative pivotal movement of the gyroscope and its mounting, electrical relay means connected with said contacts for control thereby, electric motor means connected with said object to rock the same and connected with said relay means for control thereby, and other electrical motor means under the control of said relay means to return said gyroscope contacts to normal positions relative to each other.

14. In a gyroscopic control system, in combination, electrically controlled means for rectifying a pivotally mounted object, a gyroscope, a member on which the gyroscope is pivotally mounted, a contact rigidly connected with the gyroscope, a contact connected with said member to move in harmony with said member relative to the first contact, electrical relay means connected with said contacts and with said rectifying means to control the same in harmony with the relative movements of said contacts, and means under the control of the relay means to restore the second contact to normal position relative to the first.

15. In a gyroscopic control system, in combination, a gyroscope, a mounting therefor comprising supporting means and two members capable of relative pivotal movement, an object to be maintained in predetermined angular relation to the gyroscope, a set of relatively movable electrical contacts actuated by pivotal movement of one of said two members of the gyroscope mounting relative to the gyroscope, another set of relatively movable electrical contacts actuated by pivotal movement of one of said two members of the gyroscope mounting relative to the supporting means of the gyroscope mounting, relay means controlled by said contacts, and electric motor means controlled by the relay means to cause said object to follow the changes in the angular position of the gyroscope relative to the said two members of its mounting as the latter rocks relatively to the gyroscope and to its supporting means.

16. In a gyroscopic control system, in combination, a gyroscope, a mounting therefor comprising supporting means and two members capable of relative pivotal movement, an object to be maintained in predetermined relation to the gyroscope, a set of relatively movable electrical contacts actuated by pivotal movement of one of said two members of the gyroscope mounting relative to the gyroscope, another set of relatively movable electrical contacts actuated by pivotal movement of one of said two members of the gyroscope mounting relative to the supporting means of the gyroscope mounting, relay means controlled by said contacts, rectifying motor means controlled by the relay means to cause said object to follow the changes in the angular position of the gyroscope relative to the said two members of its mounting as the latter rocks relatively to the gyroscope and to its supporting means, and electric motor means operated concomitantly with said rectifying motor means for restoring said electrical contacts to their normal relative positions.

In testimony whereof I hereto affix my signature.

FERDINAND GEORGE HENRY.